NON-DESTRUCTIVE CORE READ-OUT

Filed June 29, 1956

*INVENTOR.*
JOHN H. LANE

*BY* George Baron
ATTORNEY

United States Patent Office 2,874,374
Patented Feb. 17, 1959

2,874,374

NON-DESTRUCTIVE CORE READ-OUT

John H. Lane, Malvern, Pa., assignor to Burroughs Corporation, Detroit, Mich., a corporation of Michigan Application June 29, 1956, Serial No. 594,786
8 Claims. (Cl. 340—174)

This invention relates to information storage systems and more particularly to information storage systems utilizing magnetic cores.

In the computing art, in the communication art involving electromagnetic signalling, and in similar or related arts, information is retained in a suitable storage device, such retention being either very ephemeral, say, of the order of microseconds, or for an indefinite period. Of the many techniques for storing information in the form of electromagnetic signals, magnetic storage devices and systems utilizing such magnetic storage devices offer certain advantages over other types of storage systems, e. g., permanence of stored information over a comparatively long period without maintenance of a power supply, retention of magnetic characteristics despite long use, resistance to physical and thermal shock, etc. The storage device that retains information in the form of a stable magnetic remanence condition is a magnetic substance preferably, though not necessarily, having a reactangular hysteresis loop and can be cup-shaped or toroidal-shaped, or in the shape of strips, ribbons, or bars.

Magnetic substances that possess the characteristic of retaining information either in a positive magnetic remanent state or in a negative magnetic remanent state can be used to store signals that can be expressed in binary form. A winding coupled to such a core, when carrying current of a given polarity therethrough, can be made to drive such a core to its positive saturation level, the core settling back to its positive remanent state when the current terminates. The same winding, when carrying current therethrough of an opposite polarity, can be made to drive such a core to its negative saturation state, the core relaxing to its negative remanent state upon the termination of the driving current pulse. The two stable states can signify the storage of a binary "1" or a binary "0," wherein the positive remanent state may be arbitrarily chosen to represent the storage of a "1" and the negative remanent state the storage of a "0."

In the normal operations performed with information represented in binary form, it is desirable to be able to determine whether a magnetic storage element is retaining a "1" or a "0." In the process of determining the magnetic remanence of a storage element, namely, whether it is in its "1" or "0" state, an interrogating winding is wound about the storage element. A current pulse of the proper polarity is sent through the interrogating winding in order to test the state of the storage element. If the interrogating current finds the storage element in a magnetic remanent state so as to drive the storage element toward the nearer saturation condition of its B—H curve, relatively little flux change will take place in the flux path of such storage element. However, if the interrogating current finds the storage element in such a state so as to drive the storage element from one magnetic remanent state to its opposite magnetic remanent state, a relatively high flux change will take place in the flux path of such storage element. An output winding is normally associated with the storage element in order to sense such changes in flux.

The output winding is coupled to an indicating device which indicates these flux changes, and a large change of flux in the output winding would arbitrarily be chosen to indicate the presence of a "1" in the storage element at the time of its interrogation and a small flux change in the output winding would be indicative of the presence of a "0" in the magnetic storage element at the time of interrogation.

In the aforementioned method of testing or interrogation of the state of a binary magnetic storage element, information stored in the core is destroyed as a consequence of the interrogation. Where it was desired to interrogate a storage element without destroying the information therein, auxiliary circuits and additional pulse times have been employed in order to read back into the storage element the very information just destroyed in the process of interrogation. The instant invention is able to accomplish the non-destructive read-out of information stored in a binary magnetic storage element without the reliance on auxiliary circuits and additional pulse times. Such non-destructive read-out is attained by utilizing a bistable magnetic element having the preferred shape of a toroidal core although it is understood that other geometrical configurations could be substituted for the preferred embodiment. A read-in winding is wound about the toroidal core in order to carry a current pulse therethrough, which current pulse provides sufficient magnetomotive force (M. M. F.) to set the core in one of its two stable states. An elongated slot, having an opening whose longer dimension extends circumferentially of the toroidal core, is drilled, punched, or otherwise provided in the core so as to form a sector in the toroidal core, which sector is relied upon to modify or alter the flux path existing in the core due to a previous application of a M. M. F. via such input winding on the core. A second winding is wound about a leg of the core, which leg is formed by the elongated slot. This second winding is adapted to carry interrogating current, such current applying a M. M. F. to the core in a localized area of the core situated in the environs of the elongated slot.

When a flux path $\phi_c$ has been created in the toroidal core by the application of a M. M. F. to the input winding on the core, such flux $\phi_c$ can be represented as $$\phi_c = \frac{\text{M. M. F.}}{R_c}$$

where M. M. F. is the magnetomotive force applied to the core through such input winding and $R_c$ is the reluctance of the core to such flux path. When a M. M. F. is applied to the elongated sector of the core through the interrogating winding, the reluctance of the core momentarily increases. The localized flux path created about the sector acts as a magnetic open circuit, increasing the reluctance $R_c$ in the equation $$\phi_c = \frac{\text{M. M. F.}}{R_c}$$

Since the M. M. F. that has set the core to a given magnetic remanence can be deemed fixed, this increased reluctance causes a decrease of the flux $\phi_c$ through the core. Such change in flux can be sensed by utilizing a third winding about the core, such third winding serving to have a voltage induced therein when the flux $\phi_c$ is being diminished by the M. M. F. of the interrogating winding. The termination of the interrogating current pulse that flows through the winding wrapped about the elongated aperture of the core terminates the localized flux path created about the elongated aperture region and the toroidal core assumes its undisturbed flux condition $\phi_c$.

The aforementioned diminution of flux without reversal of flux state provides an indication of the magnetic state of the core without destroying the flux state of the core.

It is an object of this invention to provide an improved non-destructive magnetic memory device;

It is a further object to provide an improvement over heretofore existing non-destructive magnetic memory devices;

It is yet another object to attain non-destructive interrogation of bistable magnetic memory devices utilizing magnetic materials having substantially square-shaped hysteresis loop characteristics.

The novel features of the invention, as well as the invention itself, both as to its organization and method of operation, will best be understood from the following description, when read in connection with the accompanying drawings, in which Fig. 1 is an electrical schematic representation of the invention utilizing an elongated slot aperture in a bistable magnetic storage element;

Figure 1:
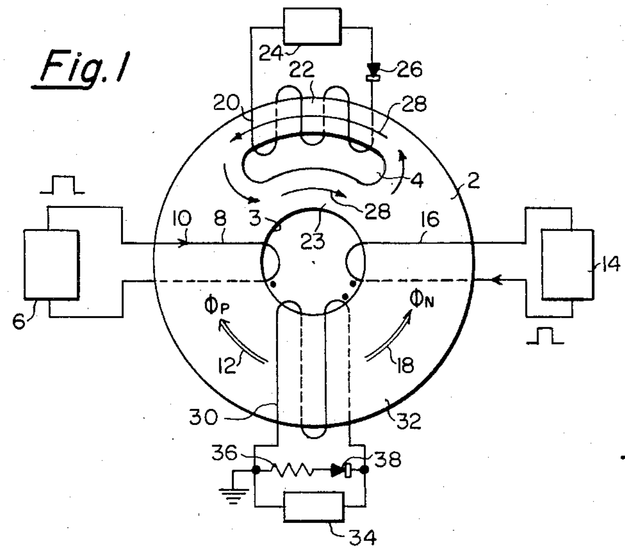
Figure 6:
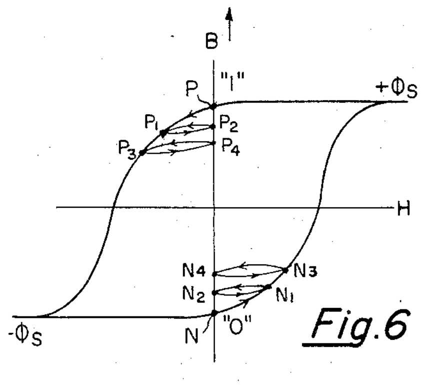
Fig. 6 is an approximate hysteresis loop of a bistable magnetic element usable as a storage device in this invention.

Referring to Fig. 1, there is shown a bistable element which is depicted, for purposes of illustrating the invention only and not for restricting its teachings thereto, as a toroidal core 2, the body of which is composed of a ferromagnetic substance having a B—H hysteresis loop of the general configuration shown in Fig. 6 of the drawing. The core body is provided with a central circular opening 3 therethrough which in this instance is shown as coaxial with the axis of the toroid. An aperture 4 is made through a portion of core body 2 between the inner and outer radial dimensions thereof with the longer dimension of the elongated aperture extending circumferentially of the core body. The core 2 is set into its "1" state by applying a current pulse from current pulse source 6 through input winding 8 in the direction of arrow 10. The current pulse will supply a magnetomotive force to the core 2 so as to drive the core to its positive saturation level $+\phi_s$, the core relaxing to its positive magnetic remanent state upon termination of such current pulse. With reference to Fig. 6, such positive remanent state P is arbitrarily chosen as representing the storage of a "1" and the negative remanent state N of the core being representative of the storage of a "0." The double-lined arrow 12 in Fig. 1 symbolizes that core 2 is in its positive magnetic remanent condition. In a similar manner, core 2 can be driven from its "1" state to its "0" state by applying a current pulse from reset pulse source 14 through winding 16 to produce enough magnetomotive force to effectuate such switching of core 2 from point P to $-\phi_s$, the core relaxing to point N of Fig. 6, after termination of the reset current pulse. Double-lined arrow 18 in Fig. 1 symbolizes the direction of flux through core 2 when the core is in its negative remanent state.

A winding 20 is wrapped about a leg 22 formed by the elongated aperture 4 and the outer periphery of the core body. An alternative location for this winding is about the leg 23 formed between the aperture and the inner periphery of the core body. A source 24 of interrogating current pulses is adapted to apply a magnetomotive force to the core 2 through diode 26 and winding 20 so as to create a localized flux path in leg 22, such flux path being symbolized by arrows 28. At another portion of the core 2, generally at that portion which is most remote from the influence of winding 20, an output winding 30 is wrapped around the core body portion 32, the current of such output winding being fed into a suitable load or signal voltage indicating device 34. A resistor 36 and diode 38 shunt the indicating device 34.

Figure 3:
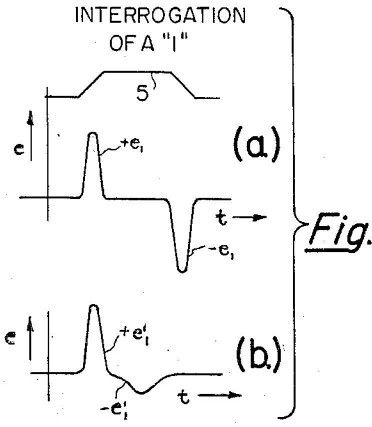
Figs. 3 and 4 are voltage-time curves depicting voltages seen at the terminals of output windings of Figs. 1 and 2 during interrogation of a bistable element of this invention.
Figure 4:
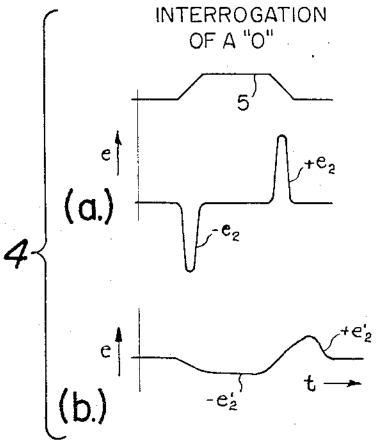

Reference is now had to Fig. 1 and to Figs. 3 and 4 in order to describe the mode of operation of non-destructive read-out of information stored in a bistable magnetic core as practiced by this invention. Assume that core 2 has been initially set to its "1" state (point P of Fig. 6) by a current pulse from set pulse source 6 having been transmitted through winding 8. It is desired to test the magnetic remanent state of core 2 without destroying the state of the core. The magnetic remanence of core 2, represented by arrow 12, could be expressed by the relationship $$\phi_c=\frac{\text{M. M. F.}}{R}$$

where $\phi_c$ is the flux existing in a clockwise direction through core 2, M. M. F. is the magnetomotive force that was applied to core 2 through winding 8, and R is the magnetic reluctance of the toroidal core 2. Once the M. M. F. has terminated, one can change the flux $\phi_c$ established by such M. M. F. by changing the reluctance of core 2. If the reluctance is made to change rapidly, the flux $\phi_c$ will change rapidly, and such rapid flux change could be sensed by output winding 30. It is the sensing of this change of flux that becomes a measure of the state of the core being interrogated.

The aforementioned reluctance change is effected by sending a current pulse from its interrogating pulse source 24 through diode 26 and winding 20 to create a flux path in legs 22 and 23 in the direction shown by arrows 28. The localized flux path created by a current pulse from interrogating pulse source 24 saturates the region surrounding the elongated aperture 4 very soon after the interrogating pulse has been initiated. Such saturation increases the reluctance R of the major magnetic path of core 2, diminishing the flux $\phi_p$ in that major magnetic path. Such diminution of flux is sensed by output winding 30. The manner in which the flux $\phi_p$ is actually diminished is illustrated in Fig. 6 of the drawing. When saturation of the localized region about elongated aperture 4 takes place at the first interrogation of the core 2, the reluctance R of the core increases so that the core traverses its hysteresis loop from point P to some point $P_1$, causing a diminution in the flux B. When the localized region around the elongated aperture returns to its non-saturated state, core 2 returns to point $P_2$ instead of point P, such return leaving core 2 in a remanent flux state $\phi_{p2}$ as well as producing a voltage pulse across the terminals of output winding 30, which voltage pulse is opposite in polarity to that obtained during the initiation of the interrogating current pulse. When core 2 is interrogated a second time, the flux $\phi_{p2}$ is decreased from point $P_2$ to point $P_3$ and upon termination of the interrogating current pulse, the core returns to point $P_4$ instead of point $P_2$. Subsequent interrogations will cause core 2 to traverse the minor hysteresis loop $P_4$ to $P_3$ and back to $P_4$ without further appreciable diminution in the flux of the major magnetic path so that repeated interrogations of the core 2 will create an output in winding 10 without destroying the positive remanent state of the core, such positive remanent state representing the storage of the binary "1."

Figs. 3 and 4 represent the voltage pulses seen at the terminals of output winding 30 during the interrogation of the magnetic remanent state of core 2. Assume that core 2 is in its "1" state and the magnetic remanent state of the core is represented by arrow 12. Interrogating signal pulse 5, when applied to winding 20, creates a localized flux path 28 about the elongated slot 4. Such localized flux path saturates the area adjacent the elongated aperture, such saturation being tantamount to the creation of an air gap in the core 2 and causing a diminution in the major flux path $\phi_p$. This diminution of magnetic flux $\phi_p$ will introduce a potential across output winding 30 such that the dotted terminal of output winding 30 is made positive. Such output voltage pulse $+e_1$ is depicted in Fig. 3*a*. When the interrogating signal pulse 5 applied to winding 20 terminates, the flux of core 2 returns to a new stable flux condition, $\phi_{p_2}$, but the voltage induced in output winding 30 during such return makes the dotted terminal of winding 30 negative. The voltage pulse $-e_1$ depicts such return of the core 2 to its magnetic remanent stable state. The voltage-time diagram of Fig. 3*a* represents the voltage amplitude configuration of a non-destructive read-out of a "1."

Fig. 3*b* depicts the voltage waveform appearing across the terminals of output winding 30 when a resistor 36 and diode 38 shunt the output circuit 34. It is seen that when the interrogating pulse 5 from source 24 initially creates the localized flux 28 about the elongated slot 4, the dotted terminal of output winding 30 has a positive potential induced thereat so that the output voltage pulse $+e_1^1$ goes through output circuit 34. However when the interrogating signal pulse 5 terminates, the magnetic field 12 of the core relaxes to point $P_2$, such return inducing a negative potential at the dotted terminal of output winding 30. Such negative potential at the dotted terminal of output winding 30 will cause induced current to flow around the output winding 30 through resistor 36 and diode 38, bypassing output circuit 34.

Such induced current is such as to act as a feedback magnetic field that opposes the magnetic flux being created during the termination of interrogation pulse 5. The resultant output pulse $-e_1^1$ has a much lower amplitude voltage because of the shunting action of resistor 36 and diode 38. The utilization of such resistor 36 and diode 38 permits greater discrimination in read-out signals by damping out the negative voltage signal $-e_1$ that would normally be seen at the terminals of output winding 30. Voltage waveform 3*b* is preferred over voltage waveform 3*a* as an indication of the nondestructive read-out of a "1" because of the single large amplitude pulse $+e_1^1$.

Figs. 4*a* and 4*b* depict the voltage-time relationship for read-out of the "0" state of core 2. Arrow 18 represents the negative remanent state of core 2, such state being shown as point N in Fig. 5. When an interrogating signal pulse 5 from interrogation signal source 24 flows through winding 20, a local flux is created in legs 22 and 23 about elongated aperture 4, and such legs 22 and 23 soon become saturated. Such saturation diminishes the major flux path $\phi_N$, such diminution of flux $\phi_N$ inducing a negative potential at the dotted terminal of output winding 30 so as to apply to output circuit 34 the voltage pulse $-e_2$. When the interrogation signal pulse 5 terminates, the voltage pulse $+e_2$ results when the flux field 18 returns to a new stable state $\phi_{N_2}$. In a manner similar to the hereinabove read-out of a "1," a second interrogation of core 2 will cause the core to traverse a minor hysteresis loop $N_2$—$N_3$—$N_4$. All subsequent interrogations will traverse the minor hysteresis loop $N_4$—$N_3$—$N_4$. It is seen that Fig. 4*a* is the mirror image of Fig. 3*a*, which is to be expected when a simple output winding 30 is relied upon. However Fig. 4*b* depicts the manner in which output signal pulses $-e_2$ and $+e_2$ are modified when resistor 36 and diode 38 shunt the output circuit 34. When the flux state of the core is in its negative remanent state $\phi_N$, interrogating current creates a localized magnetic field about elongated slot 4 and diminishes the major flux path $\phi_N$. Such diminution of flux $\phi_N$ tends to induce a voltage in output winding 30 so as to produce a negative potential at the dotted terminal of winding 30. Such negative potential will cause momentary current flow about winding 30 through resistor 36 and diode 38, such induced current flow loading core 2. Consequently the loading of core 2 prevents the rapid change in flux that caused voltage pulse $-e_2$ in Fig. 4*a* when no diode 38 was used. This slowing down of flux change results in a longer but smaller amplitude output signal pulse $-e_2$ shown in Fig. 4*b*. When the interrogation signal pulse terminates, the return flux change is substantially equal and opposite to the previous flux change, but the flux change occurs more rapidly because the core 2 is not acting as a load during such return of the core 2 to its negative magnetic remanent state $\phi_N$.

Figs. 3*b* and 4*b* indicate that the shunting of the output circuit 34 with a resistor 36 and diode 38 permits a single high amplitude voltage pulse $+e_1$ to be sensed by output circuit 34 during the non-destructive interrogation of a "1" or a "0," whereas the other three voltage pulses $-e'_1$ and $-e'_2$ and $+e'_2$ are substantially reduced in amplitude. Consequently, discrimination between a "1" read-out and a "0" read-out is obtained. It is noted that the setting of core 2 from its negative remanent state N to its positive remanent state P or from its positive remanent state P back to its negative remanent state N will produce much higher amplitude voltage pulses in output winding 30 than those pulses produced in said winding 30 during interrogation of core 2. Suitable circuit means may be employed to inhibit the high amplitude voltage pulses that would appear across the terminals of output winding 30 during the setting and resetting of core 2, or the high amplitude pulses that result from such setting and resetting steps could be sensed and easily distinguished from the non-destructive read-out signals.

The present invention is an improvement over a non-destructive read-out magnetic device described and claimed in a co-pending application for patent of Chedaker et al. entitled "Magnetic Device," Serial No. 248,716, filed September 28, 1951, and a device employing a circular aperture as the interrogating aperture, such other device being described and claimed in a copending application of Tung Chang Chen entitled "Magnetic Device," Serial No. 383,801, filed October 2, 1953, both being assigned to the same assignee as the assignee of the present applicant. The instant invention, by employing an elongated slot instead of a circular aperture, permits a larger sector of a core body to act as a localized flux field, such larger flux field creating a greater change in the major flux paths 12 or 18 of core 2, which greater change is sensed by output winding 30. Such increased localized field flux is attained without lessening the combined cross-sectional area of the leg portions of the core body on opposite sides of the interrogating aperture.

Figure 2:
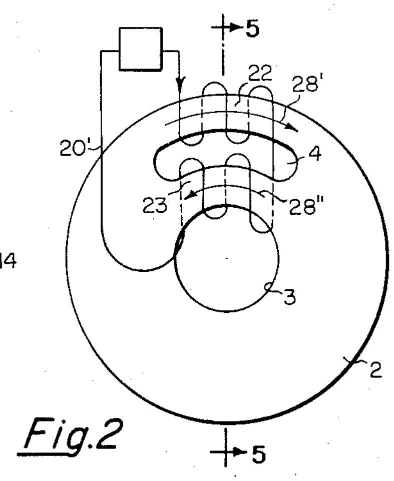
Fig. 2 is another embodiment of the invention shown in Fig. 1 with some of the electrical circuitry of Fig. 1 removed in order to more particularly point out those features of Fig. 2 that distinguish over the embodiment shown in Fig. 1.
Figure 5:
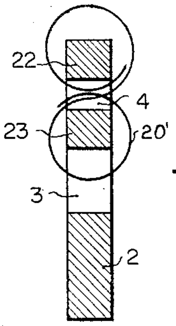
Fig. 5 is a cross sectional view taken along line 5—5 of Fig. 2.

Figs. 2 and 5 show an embodiment of the invention similar to that shown in Fig. 1 save that the interrogating winding 20′ is wound through the aperture 4 and the two legs 22 and 23 of the core body in a figure 8 pattern so as to create a flux field 28′ in one direction in the upper leg 22 and a flux field 28″ in the opposite direction in the lower leg 23 of core 2 as shown in Fig. 2. It is seen that the voltage signal produced across the terminals of output winding 30 (not shown in Figs. 2 and 5) would be independent of the direction of the interrogating current pulse through windings 20 and 20′ because of the symmetry of the localized magnetic field created by interrogating current flowing through the "figure 8" winding.

The output winding 30 is placed about the core 2 at a position along the core 2 which is furthest away from interrogating winding 20, since it is desirable to avoid as much as possible any direct transformer action between windings 20 and 30.

There has been described herein a novel and improved magnetic memory system that attains non-destructive read-out of information stored as magnetic remanent states in said magnetic memory system without relying upon auxiliary circuitry or time losses in returning the information back to the memory system from which it was extracted.

What is claimed is:

1. A static magnetic memory device comprising a body of uniform magnetic material capable of assuming either of two stable states of magnetic remanence, said magnetic body completely surrounding, and thereby forming a main flux path completely surrounding, an area whose permeability is low relative to that of said magnetic body; means for applying a magnetizing force to said magnetic body to set said body in either one or the other of its two stable states, thereby to store digital information in said body; and means for sensing the information stored in said magnetic body without destroying said information, said sensing means comprising: a single slot through said body having long-dimension side walls and short-dimension end walls, said side walls being at least twice as long as said end walls, said side walls being substantially parallel with the flux lines of said main flux path; an interrogating winding extending through said slot and forming a loop about that portion of said body which runs along but one side wall of said slot; means for passing a pulse of current through said interrogating winding tending, in the absence of other magnetizing forces, to establish momentarily a flux field looping said slot, thereby to alter momentarily the main flux of said body and thereby to alter momentarily the strength of the main flux field without changing its remanence polarity; and means, including an output winding forming a loop about a non-slotted portion of said magnetic body for detecting any alteration in strength in the remanence polarity of said main flux field.

2. Apparatus as claimed in claim 1 characterized in that said detecting means includes a load impedance connected across said output winding and a unidirectional conducting device shunting said load impedance.

3. Apparatus as claimed in claim 2 characterized in that said low-permeability area which is completely surrounded by said magnetic body comprises a principal aperture through said body.

4. A magnetic storage device comprising an annularly shaped core of magnetizable material capable of assuming either of two stable states of magnetic remanence; means for creating a main magnetic flux completely around the core in one direction or the other to set the core in one or the other state of remanence, said core having an aperture through a portion of the core between the inner and outer radial dimensions thereof, the axis of said aperture being in a direction substantially parallel to the axis of said core, said aperture being in the form of an elongated slot with the longer sides being at least twice as long as the shorter sides, said longer sides being substantially parallel with the perimeter of said core; an interrogation winding for receiving an interrogation current pulse, said interrogation winding extending through said slot and forming a loop about one of the two legs established in said core by said slot; and means including an output winding through the main opening of said annular core for sensing any change in main flux resulting from the flow of said interrogation current and for producing a signal indicative of the remanent state of said core without requiring said core to switch its state.

5. A magnetic storage device comprising an annularly shaped core of magnetizable material capable of assuming either of two stable states of magnetic remanence; means for creating a main magnetic flux completely around the core of one polarity or the other thereby to place said core in one or the other state of remanence, said core having an aperture through a portion of the core between the inner and outer radial dimensions thereof, said aperture being in the form of an elongated slot and forming in the core a first leg near the outer radial dimension and a second leg near the inner radial dimension of said core, the longer sides of said slot being at least twice as long as the shorter sides, said longer sides extending substantially parallel with the perimeter of the core; an interrogation winding extending through said slot and looped about one of said legs for receiving an interrogation current pulse; and means including an output winding through the main opening of said annular core for sensing any change in the main flux resulting from the flow of interrogation current through said interrogation winding and for developing an output signal indicative of the remanent state of said core without requiring said core to switch its state.

6. Apparatus as claimed in claim 5 characterized in that said means for sensing the change in the main flux includes a load in series with said output winding and a unidirectional current conducting device in shunt with said load for offering a low impedance shunt across said load for output signals of one polarity and a high impedance shunt for output signals of opposite polarity.

7. A magnetic storage device as claimed in claim 5 characterized in that said interrogation winding is looped about said first leg.

8. A magnetic storage device comprising an annularly shaped core of magnetizable material capable of assuming either of two stable states of magnetic remanence; means for creating a main magnetic flux completely around the core of one polarity or the other thereby to set said core in one or the other remanent state, said core having an aperture through a portion of the core located between the inner and outer peripheries of said core, said aperture being in the form of an elongated slot with the longer sides being at least twice as long as the shorter sides, said longer sides being arcuate and extending substantially parallel to the peripheries of said core to form a first leg in the core near the outer periphery and a second leg near the inner periphery of said core, an interrogation winding through said aperture and wound about both of said legs in such manner that, in the absence of other magnetizing forces, current through said interrogation winding tends to drive flux locally around said aperture; and means including an output winding coupled to the main body of the core for sensing the change in main flux which results when interrogation current is driven through said interrogation winding and for producing a signal indicative of the remanent state of said core.

References Cited in the file of this patent

UNITED STATES PATENTS

| | | |
|---|---|---|
| 2,519,426 | Grant | Aug. 22, 1950 |
| 2,708,219 | Carver | May 10, 1955 |
| 2,720,597 | Stuart-Williams et al. | Oct. 11, 1955 |

FOREIGN PATENTS

| | | |
|---|---|---|
| 881,089 | Germany | June 25, 1953 |

OTHER REFERENCES

"A New Nondestructive Read for Magnetic Cores," by Thorensen and Arsenault, pp. 111–116, "1955 Western Joint Computer Conference." (Copy in Div. 42.)

"Magnistor Circuits," by Snyder, "Electronic Design," for August 1955, pp. 24–27. (Copy in Div. 42.)